(12) United States Patent
Brown

(10) Patent No.: US 11,345,606 B2
(45) Date of Patent: May 31, 2022

(54) DEPOSITION PARTICLES AND A METHOD AND APPARATUS FOR PRODUCING THE SAME

(71) Applicant: David Brown, Helsinki (FI)

(72) Inventor: David Brown, Helsinki (FI)

( * ) Notice: Subject to any disclaimer, the term of this patent is extended or adjusted under 35 U.S.C. 154(b) by 61 days.

(21) Appl. No.: 15/435,318

(22) Filed: Feb. 17, 2017

(65) Prior Publication Data

US 2018/0236484 A1    Aug. 23, 2018

(51) Int. Cl.
| | |
|---|---|
| *G02B 6/02* | (2006.01) |
| *C01G 23/053* | (2006.01) |
| *C01G 49/06* | (2006.01) |
| *C01B 33/18* | (2006.01) |

(52) U.S. Cl.
CPC ............ *C01G 23/053* (2013.01); *C01B 33/18* (2013.01); *C01G 49/06* (2013.01); *C01P 2002/60* (2013.01); *C01P 2004/61* (2013.01); *C01P 2004/62* (2013.01); *G02B 6/02395* (2013.01); *Y02P 40/57* (2015.11)

(58) Field of Classification Search
CPC ........ C01B 33/18; G02B 6/02395; B05D 5/06
See application file for complete search history.

(56) References Cited

U.S. PATENT DOCUMENTS

| | | | |
|---|---|---|---|
| 4,230,472 A | 10/1980 | Schultz | |
| 4,642,129 A | 2/1987 | Douklias et al. | |
| 4,867,774 A | 9/1989 | Dorn | |
| 4,940,571 A * | 7/1990 | Su | ............ C01B 33/163 |
| | | | 423/339 |
| 5,925,228 A | 7/1999 | Panitz | |
| 6,360,562 B1 | 3/2002 | Kodas | |
| 6,705,127 B1 * | 3/2004 | Cain | ................. C03B 37/01413 |
| | | | 423/336 |
| 6,723,432 B2 | 4/2004 | Sugo | |
| 6,723,435 B1 | 4/2004 | Horne et al. | |
| 2002/0078714 A1 | 6/2002 | Bird | |
| 2003/0232200 A1 * | 12/2003 | Bryan | ....................... B32B 9/04 |
| | | | 428/446 |

(Continued)

FOREIGN PATENT DOCUMENTS

| | | |
|---|---|---|
| EP | 0463783 A1 | 1/1992 |
| EP | 0978486 A1 | 2/2000 |
| GB | 2015991 A | 9/1979 |

(Continued)

*Primary Examiner* — Elizabeth A Burkhart
(74) *Attorney, Agent, or Firm* — Jacob Eisenberg

(57) ABSTRACT

Disclosed is a method for producing deposition particles or intermediate particles, characterized in that the method comprises: forming a solution comprising a solvent and one or more deposit sources, aerosolizing the formed solution to produce an aerosol of precursor particles comprising the deposit source, conditioning the precursor particles to produce deposition particles or intermediate particles from the deposit source and collecting said particles. The particles may be collected as a deposit or precursor deposit on a substrate. The particles may include a matrix material and a dopant. The conditioning may be quenched to produce a desired substructure. The matrix material may be essentially optically clear. The substrate may comprise an optical fiber or an optical fiber preform or mandrel.

8 Claims, 4 Drawing Sheets

(56) References Cited

U.S. PATENT DOCUMENTS

2004/0187525 A1* 9/2004 Coffey .............. C03B 37/01413
　　　　　　　　　　　　　　　　　　　65/390
2007/0240454 A1* 10/2007 Brown .............. C03B 37/01294
　　　　　　　　　　　　　　　　　　　65/401

FOREIGN PATENT DOCUMENTS

| GB | 2067181 A | 7/1981 |
| JP | 2003020243 A | 1/2003 |
| WO | 0007950 A1 | 2/2000 |

* cited by examiner

DEPOSITION PARTICLES AND A METHOD AND APPARATUS FOR PRODUCING THE SAME

FIELD OF THE INVENTION

The present invention generally relates to single and multi-component deposition particles and deposits and to the production thereof and more specifically, to said particles and deposits and the production of said particles and deposits with controlled composition and structure which can be used for producing coatings, layers and structures including coatings, layers and three-dimensional structures, particularly, for the manufacture of optical fibers and optical fiber preforms wherein the deposition particles and/or deposits comprise matrix material (matrix) and may further comprise dopant material (dopant).

BACKGROUND OF THE INVENTION

Deposition particles are important for producing coatings, layers and three-dimensional structures. It is desirable, in some cases, not only to accurately control the overall composition but also the internal structure and distribution of components inside a deposition particle or in a deposit. Canadian patent 2694173 details a method for producing optical fibers and optical fiber preforms from such deposition particles and deposits. For their use in the preparation of optical fibers and preforms according to said method, the particles may consist of multiple components but always including at least one essentially optically clear matrix material (termed matrix), such as silica. Additional components may be used to alter a property, e.g., the index of refraction, so as to create deposition layers with varying properties (e.g. indexes of refraction). In optical fibers, the purpose of varying the index of refraction is to achieve essentially total internal reflection (TIR) of the electromagnetic radiation, e.g. light, transmitted inside the fiber, via a difference, such as a step function or gradient, in the index of refraction across the chord of the optical fiber. Such additional components are termed dopant materials or dopants. Dopants may, for instance, increase or decrease the index of refraction of the material. For such applications for the production of optical preforms and optical fiber for the controlled transmission of electromagnetic radiation, and in particular light, it is critical that any substructure within the deposition particles have dimensions below the radiation (e.g. light) wavelength to be transmitted. It is particularly desirable that the substructure be nano-structured, to allow the efficient transmission of short wave and/or high frequency radiation.

To date, no method or apparatus has been demonstrated to cost effectively and consistently produce such deposition particles and/or deposits. Moreover, no method or apparatus has been demonstrated to produce deposition particle precursor particles (termed precursor particles) or intermediate deposition precursor particles (termed intermediate particles) which may be further transformed into deposition particles, deposition particle deposits (termed particles deposits or deposits) and/or precursor particles deposits (termed precursor deposits) which may then be transformed into deposits.

SUMMARY OF THE INVENTION

A method for producing deposition particles is disclosed comprising forming a solution comprising a solvent and a deposition material and/or deposition precursor material which is dissolved, emulsified or otherwise distributed therein. The solution may be aerosolized to produce precursor particles comprising deposition materials and/or deposition precursor materials. The precursor particles may be conditioned and deposition particles or intermediate deposition particles may be produced. The intermediate deposition particles may be further conditioned to produce deposition particles. The deposition material may be a optical fiber or optical fiber preform material.

The solvent can be removed, e.g. by evaporation or chemical reaction, so that one or more of the deposition materials are no longer in solution, emulsified or otherwise dispersed in the solvent. Consequently, the deposition material and/or deposit can be in a solid, liquid, glassy or molten state. The particle can be further conditioned, e.g. by adding energy or through chemical reaction to release or synthesize the deposition material a deposition material precursor.

Additionally, it is possible to maintain or store the liquid, solid or molten deposition particles in an intermediate state (i.e. as deposition particles or in a state essentially without solvent but before they are conditioned for deposition) as deposition particles or intermediate particles for later dispersion in an aerosol reactor.

The liquid, solid or molten final deposition particles or intermediate deposition particles can be stored on a substrate or in a secondary solution where they be dispersed, for instance, by means of a surfactant to be later aerosolized into a deposition material synthesis reactor or coated or otherwise deposited on a substrate.

The deposition particles or intermediate deposition particles can be immediately used while in the carrier gas to produce deposition materials or can be immediately further conditioned while in the carrier gas to produce deposition particles which are immediately used while in the carrier gas to produce deposition materials or deposition material deposits and, thus, are not collected and stored on a substrate or in solution for later use.

The synthesized deposition material may be subsequently deposited onto a substrate.

One aspect of this disclosure is focused on deposition particles and/or deposits having no supermolecular substructure. Another aspect of this disclosure focuses on deposition particles and/or deposits having a supermolecular structure but having said substructure below a critical spatial dimension, which, for optical fiber, is the shortest wavelength of the light to be transmitted in or through the fiber. Particles having substantially no substructure larger than a predetermined dimension (e.g. the wavelength of light to be transmitted in a fiber) are said to be substructure optimized.

Another aspect of this disclosure is on deposition particles and/or deposits having no supermolecular substructure or a substructure with dimensions less than the shortest wavelength of light to be transmitted and more preferably, having a nano-scale substructure. Another aspect of this disclosure is on means of producing said deposition particles and/or deposits in one or more steps from deposition particle precursor particles, which preferentially comprise condensed phase (liquid, glass, molten or solid) matrix materials and/or their precursors (termed matrix sources or matrix material sources). Another aspect of this disclosure is on means of producing said deposition particles and/or deposits from deposition particle precursor particles, which preferentially comprise condensed phase (e.g. liquid, glass, molten, or solid), gaseous phase (e.g. gas or vapor) and/or multi-phase (e.g. aerosol) dopant materials and/or their precursors (termed dopant sources or dopant material sources). Another aspect of this disclosure is on producing deposition particle precursor particles from a solution of matrix and/or dopant sources. Another aspect of this disclosure is on means of producing deposition particles and/or deposition particle precursor particles and/or deposits from condensed phase (e.g. liquid, glass, molten or solid) matrix materials (matrix) and/or matrix material precursors (matrix sources) in combination with one or more gaseous and/or condensed phase dopant materials and/or dopant material precursors (dopant sources) to produce multi-component deposition particles and/or deposition precursor particles. Another aspect of this disclosure is on a means of producing said deposition particles and/or deposition particle precursor particles and/or deposits, preferably, from condensed phase dopant sources and gaseous phase matrix sources wherein, the matrix material and/or matrix material precursor (matrix source) is deposited by condensation on aerosolized and/or nucleated dopant material and/or dopant material precursor (dopant source) particles to produce multi-component deposition particles and/or deposition precursor particles and/or intermediate particles and/or deposits and/or precursor deposits. Another aspect of this disclosure is on a means of producing said deposition particles and/or deposition particle precursor particles and/or intermediate particles and/or deposits, preferably, from condensed phase matrix sources and gaseous phase dopant sources wherein, the dopant material and/or dopant material precursor (dopant source) is deposited by condensation on aerosolized and/or nucleated matrix material and/or matrix material precursor (matrix source) particles to produce multi-component deposition particles and/or intermediate particles and/or deposition precursor particles and/or deposits and/or precursor deposits.

According one aspect of this disclosure, a method for producing deposition particles or deposition precursor particles is disclosed. The method comprises: forming a solution (e.g. my mixing, e.g. in a mixer) comprising at least one solvent or liquid dispersing media (hereto generally referred to as a solvent) and at least one source material comprising at least one deposition material and/or deposition precursor material (deposition precursor) (together deposition material sources or material sources or source materials), wherein the one or more source material is dissolved, emulsified or otherwise dispersed in the solvent; aerosolizing the formed solution to produce precursor particles comprising source material and solvent (the solution or precursor solution); and conditioning the deposition particle precursor particle to produce deposition particles, intermediate deposition particles (termed intermediate particle defined below), deposition particle precursor particles (termed precursor particles), a precursor deposit and/or a deposit from the deposition particles and/or deposition particle precursor particles. Should the initial deposit be a precursor deposit and/or an intermediate particle, the method may include an additional step of conditioning the precursor deposit and/or intermediate particle to produce a deposition particle and/or a final deposit (a deposit).

Some or all conditioning may already take place when the source materials is in precursor solution or mixer and a fully or partially conditioned solution may be aerosolized to produce deposition particles, deposition precursor particles and/or intermediate particles.

One use of examples according to the present invention is to provide a means to produce particles having no supermolecular structure or having a substructure below a critical dimension, in particular deposition particles for the production of optical fiber and optical fiber preforms, having a substructure preferably of dimensions below the minimum wavelength of light to be transmitted and more preferably of nano dimensions and below.

Deposition materials here includes any materials present in the (final) deposit. Deposit sources (or deposition or deposit material sources) here includes deposition materials and/or deposition material precursors (precursors). Deposition material precursors here includes materials which may be transformed or formed into a deposition material or deposit by conditioning.

Conditioning means the process of transforming a precursor (particle, material or deposit) to a (final or intermediate) product (particle, material or deposit) and may take any of a number of forms which will be detailed below. Some or all of the conditioning may take place an any stage of the process from the initial forming of the solution to the forming of the deposition layer on the deposition substrate.

Deposition particles and deposits may also include doped deposition particles and doped deposits in which the particle and/or deposit may contain a dopant and a matrix.

A generalized example method for producing deposition particles, intermediate particles, deposits and/or intermediate deposits is shown in FIG. 1 and may be characterized in that the method may comprise forming a solution (1) comprising a solvent (24) and one or more deposit sources (25), aerosolizing (3) the formed solution in a carrier gas (2) to produce an aerosol (27) of precursor particles (4) comprising one or more deposit sources (25), conditioning (5) the precursor particles (4) to produce deposition particles (6) or intermediate particles (26) from the deposit source and collecting (7) said particles (6,26). The deposition particles (6) or intermediate particles (26) may be collected as a deposit (28) or precursor deposit (29) on a substrate (20). Intermediate particles (26) may be further conditioned (5) to produce deposition particles (6) or collected as intermediate particles (26) or a precursor deposit (29). Precursor deposits (29) may be further conditioned (not shown) to produce deposits (28). Multiple deposit sources (24) may be added to the solution (1) or to the aerosol (27) (not shown). A deposit source may comprise a matrix source and/or a dopant source. The conditioning of the precursor particle (4), intermediate particle (26) and/or precursor deposit (29) may be quenched. The matrix material may be essentially optically clear. For the production of optical fibers and preforms, the substrate (20) may be, for instance, an optical fiber, an optical preform or a mandrel which may be removed, for instance, once the deposit is complete. The method may be used to produce an optical fiber or an optical fiber preform. The solution comprising the deposit source (1) may be fully or partially conditioned (5) already before being aerosolized (3) into precursor particles (4) or intermediate particles (26).

An apparatus for producing deposition particles or intermediate particles may be characterized in that the apparatus comprises means for forming a solution comprising a solvent and one or more deposit sources, means for aerosolizing the formed solution to an produce and aerosol of precursor particles comprising the deposit source, means for conditioning the precursor particles and/or intermediate particles to produce deposition particles or intermediate particles from the deposit source and/or precursor particles and means for collecting said particles. The apparatus may further comprise means for conditioning the intermediate particles to produce deposition particles. The apparatus may further comprise means for conditioning the precursor deposit to produce a deposit. The apparatus may further comprise means for adding one or more deposit sources to the solution or to the aerosol. The apparatus may further provide a means of quenching the conditioning of the precursor particle, the intermediate particle and/or precursor deposit.

A precursor particle may be made with the described method and/or the apparatus and may comprise a solvent and a source material.

The method, apparatus and/or the particles may be used to produce a deposit or precursor deposit. The method, apparatus, the particles and/or deposit may be used to produce an optical fiber and/or optical fiber preform.

DETAILED DESCRIPTION OF THE INVENTION

Figure 1:
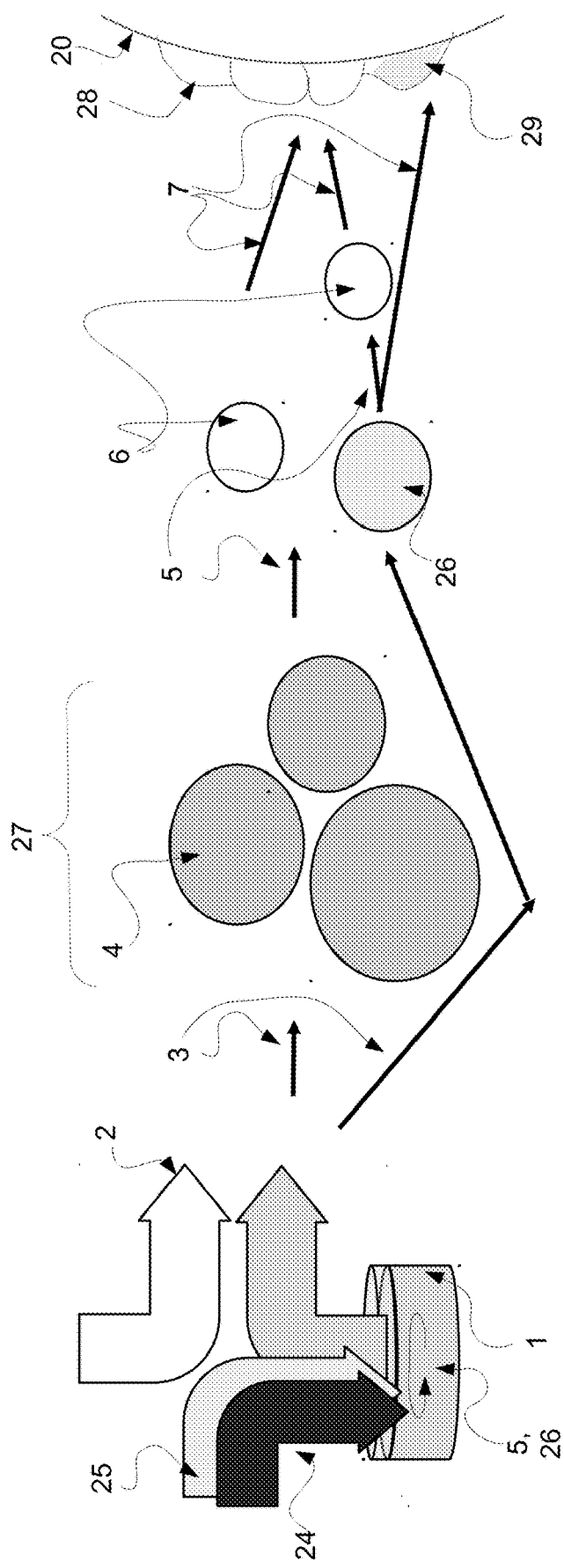
FIG. 1: A representation of the production process of deposition particles, intermediate particles, deposition particle precursor particles, deposits and precursor deposits.
Figure 2:
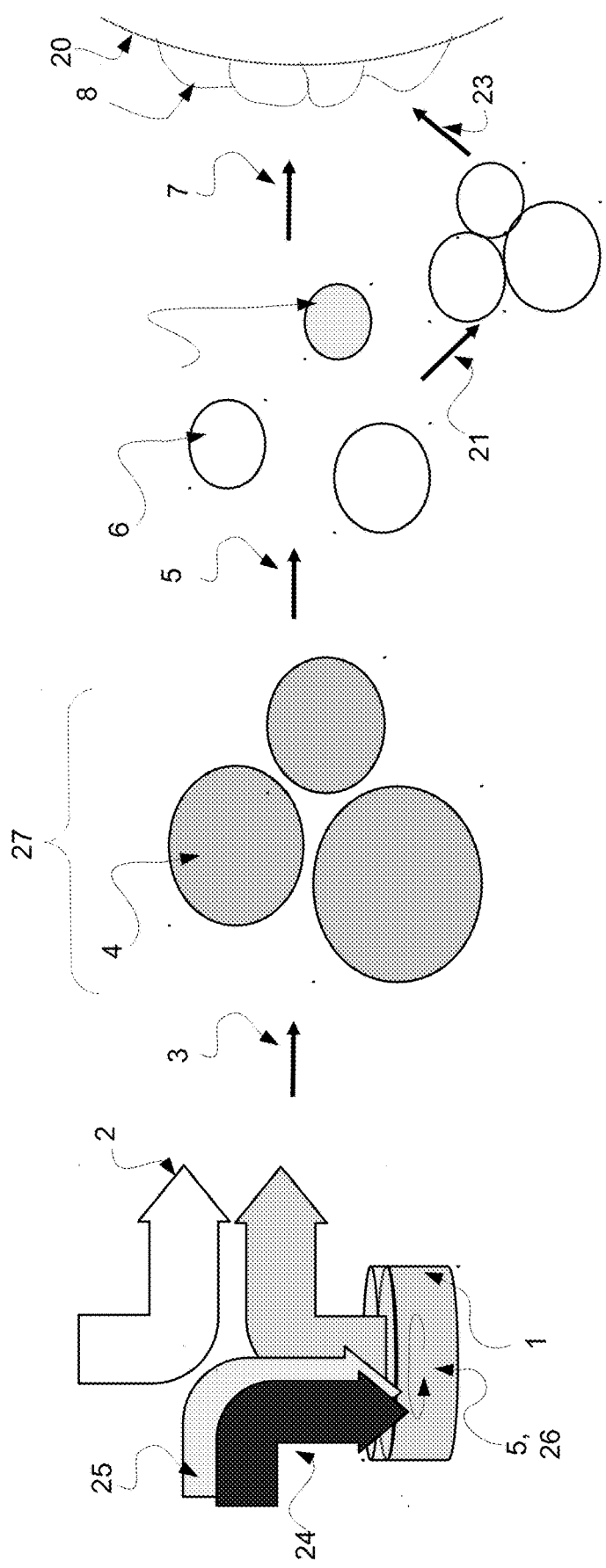
FIG. 2: A representation of the production process of deposition particles, intermediate particles, deposition particle precursor particles, deposits and precursor deposits.
Figure 3:
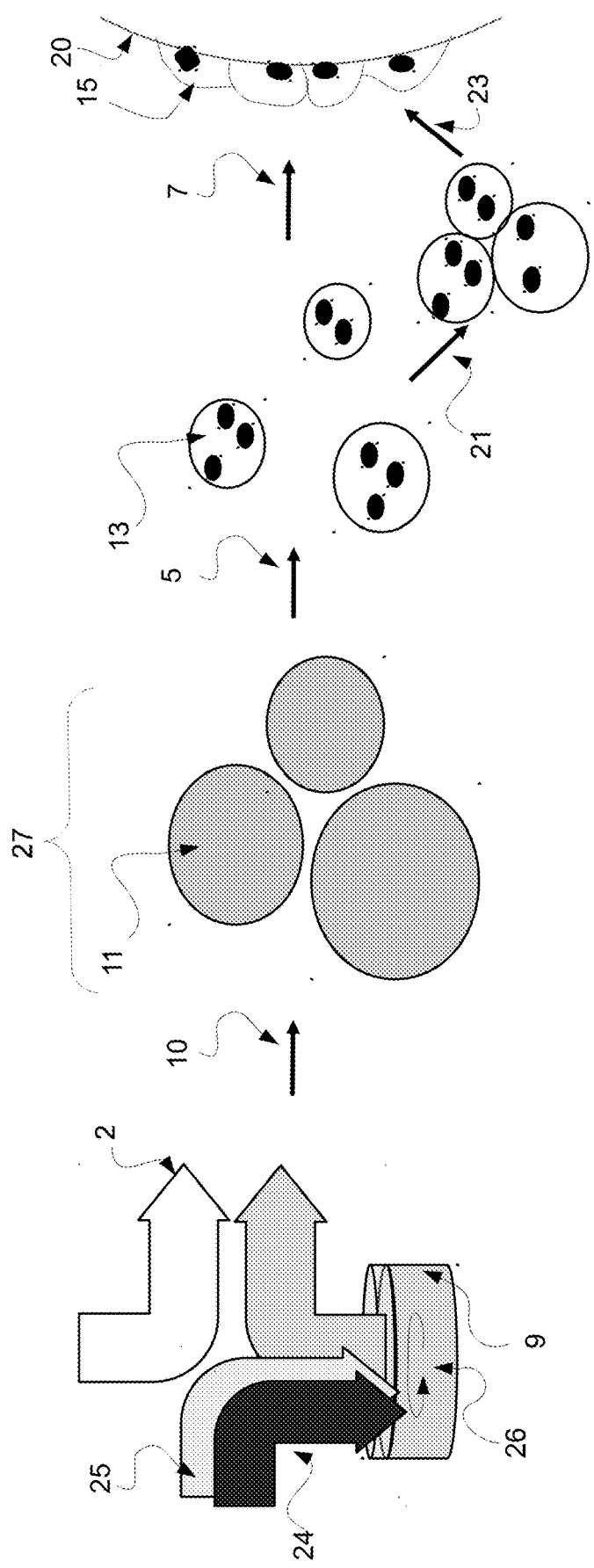
FIG. 3: A representation of the production process of multi-component deposition particles, intermediate particles, deposition particle precursor particles, deposits and precursor deposits having a substructure below a critical dimension wherein both matrix and dopant sources are in the solution.
Figure 4:
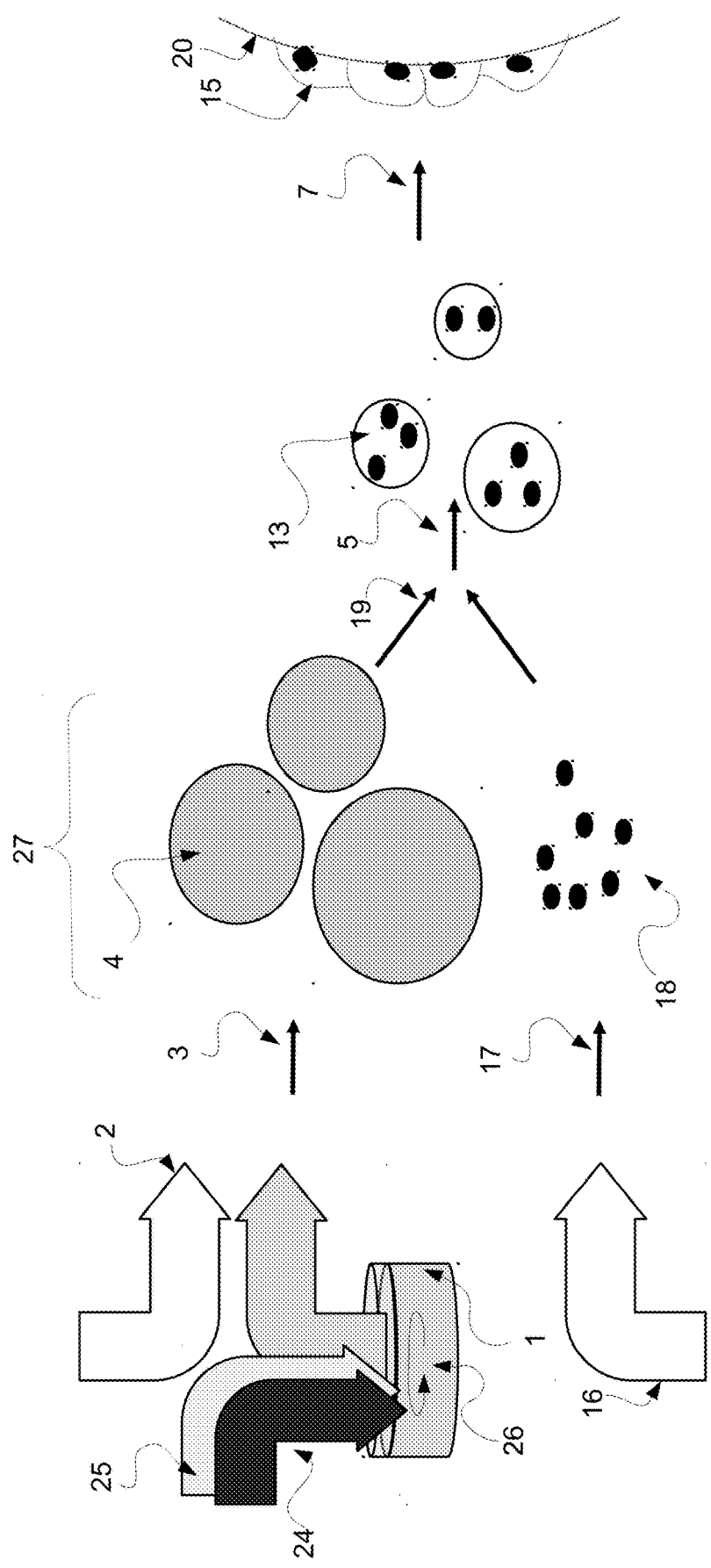
FIG. 4: A representation of the production process of multi-component deposition particles, intermediate particles, deposition particle precursor particles, deposits and precursor deposits having a substructure below a critical dimension wherein the the sources for at least one of the components are present in the gas phase.

Referring to FIG. 2, precursor particles (4), intermediate particles (26) and/or a deposit (8) or precursor deposit (29) can be produced by producing a precursor solution (1) comprising at least one matrix material and/or matrix material source material (a matrix or matrix material and/or a matrix material precursor or matrix precursor). The precursor solution may also include one or more dopant material and/or dopant material precursors (dopant sources 24) by, e.g. mixing (26) one or more solvents (25) and one or more source materials (24) which may comprise deposition materials (matrix and/or dopant) and/or their precursors (material sources) (some or all conditioning (5) may take place already in this stage), aerosolizing (3) the deposition particle precursor solution (the precursor solution or solution 1) in a carrier gas (2) by the use of an aerosolizer to produce an aerosol (27) of deposition particle precursor particles (precursor particles 4) suspended in the carrier gas (2). Said precursor particles (4) may then be conditioned (5) in a particle conditioner to produce deposition particles (6) and/or intermediate deposition particle precursor particles (26) which may be full converted to deposition particles or partially converted to intermediate particles (6), which may be then directly collected (7) on a substrate (20) to produce a deposit (8) or precursor deposit (29) or which may be indirectly collected (21) as, e.g., a powder (22) and then re-aerosolized and deposited (23, 7) to produce a deposit (8) and/or precursor deposit (29). Said deposit may be a material, intermediate and/or precursor deposit which at least comprises a matrix source material (a matrix material and/or matrix material precursor) and may also comprise a dopant source material (dopant material which may comprise a dopant material and/or a dopant material precursor), for instance, on a substrate (20) which may be, for instance, an optical fiber preform or mandrel or an optical fiber.

A conditioner can have one or more stages so as to condition the deposition particles and/or deposition particle precursor particles and/or intermediate particles and/or precursor deposit in one or more steps.

Precursor solution may be produced, e.g. my mixing the source material(s) and solvent in a mixer. For the synthesis of doped deposition particles, both a dopant source material (dopant source) and a matrix source material (matrix source) (together source materials) need to be introduced. The source materials may be introduced at any point during this method and can be introduced in the original precursor solution either as the material or as the material precursor and/or introduced as a vapor of material and/or material precursor. The dopant can, for instance, aid in control of properties of deposition material.

The dopant may aid in controlling one or more property of the deposition particles and/or deposition layer to be produced. Examples of a property varied or controlled include, but are not limited to, the index of refraction, the melting point, the glass transition temperature and/or the boiling point of the deposition particle and/or the deposition particle precursor particle and/or the intermediate particle and/or the deposit and/or the precursor deposit and/or deposition material(s) and/or their precursors.

In any embodiment, matrix and/or dopant materials can be fully or partially conditioned already before aerosolization while in the solution mixer.

FIG. 3 depicts a more detailed description wherein the method also includes an optional step of adding, in addition to the matrix source material, one or more dopant source materials as a source material (together 24) to produced doped deposition particles (11), doped deposition precursor particles (13) and/or doped intermediate particles (30) and/or a doped deposit (15) and/or a doped precursor deposit (31). Said doped particles can be produced by producing (e.g. in a mixer as are known in the art) a doped precursor solution comprising matrix material and/or matrix material precursor (precursor solution 9), aerosolizing (10), e.g. with an aerosolizer, the precursor solution (9) in a carrier gas (2) to produce an aerosol (27) of doped precursor particles (precursor particles 11) suspended in the carrier gas (2). Said precursor particles (11) are then conditioned (e.g. in a particle conditioner 5) to produce deposition particles (13) or intermediate particles (30), which may be then collected (7) to produce doped deposit (15) or precursor deposit (31), for instance, on a substrate (20) which may be, for instance, an optical fiber preform or optical fiber or collected as a powder (22) for later use. Additional matrix and/or dopant sources (24) may be introduced at any moment during the production of deposition particles, intermediate particles, precursor particles or deposits, i.e. added to the precursor solution e.g. in the mixer, introduced during aerosolization in an aerosolizer or during or after conditioning in or after a particle conditioner. One or more matrix materials and/or matrix material precursors (matrix/matrix material sources) may also be introduced and any stage of the process. Particles (13, 30) may be indirectly collected (21) as, e.g., a powder (22) and then re-aerosolized and deposited (23, 7) to produce said deposit (15) and/or precursor deposit (31), for instance, on a substrate (20) which may be, for instance, an optical fiber preform or mandrel or an optical fiber.

Referring to FIG. 4, doped deposition particles and/or deposition precursor particles and/or intermediate particles and/or deposits and/or precursor deposits can be produced by producing a precursor solution comprising matrix material and/or matrix material precursor (1) as in FIG. 2, aerosolizing the precursor solution (3) in a carrier gas (2) to produce precursor particles (4) suspended in the carrier gas. Said particles (4) are then mixed (19), e.g. in a mixer, with dopant material and/or dopant precursor (e.g. in the gas phase) (not shown) and/or dopant material precursor material particles (18) (in the condensed phase) which may be produced, e.g., by nucleation (17) of gas phase dopant material or dopant material precursor (e.g. by mixing the two sources in e.g. a mixing chamber) and then conditioned (in a particle conditioner) (5) to produce doped precursor particles (13), intermediate particles (30) and/or deposition particles (13), which may be then collected (7) to produce a doped deposit and/or precursor deposit (collectively 15), for instance, on a substrate (20) which may be, for instance, an optical fiber preform or mandrel or optical fiber. The deposition particles and/or deposition precursor particles may also be collected (21) as a powder (22) and later aerosolized (23) with an aerosolizer and deposited on the substrate (20). Similarly, doped deposition particles can be achieved according to the method by following the above procedure, however, substituting matrix for dopant and vice versa.

For clarity, in any embodiment, doped deposition particles, doped intermediate particles and doped precursor particles may also be referred to as or as a subclass of deposition particles, intermediate particles and/or precursor particles.

For clarity, in any embodiment, deposition particles, intermediate particles or deposition particle precursor particles may be deposited on a substrate. When deposition particle precursor particles are deposited, they and/or a deposit comprising such particles may be further conditioned in a deposit conditioner.

In an embodiment, the deposition precursor particles are conditioned to produce deposition particles and/or intermediary deposition particles. The deposition particles may be produced from the deposition precursor particles and/or the intermediary deposition particles, for instance, when deposition material is released and/or synthesized from the source material comprising deposition materials or their precursors and deposition particles are formed.

Source materials can be prone to release or form the deposition material during the conditioning of the precursor particles, for instance, through chemical reaction or thermal decomposition. For clarity, in any embodiment, conditioning (e.g. a particle conditioning and/or deposit conditioning), may include any means to condition the particle and/or the deposit. Particle and deposit conditioners may include, e.g., an oven, a reactor or a vibration, irradiation, reaction, expansion or compression chamber or vessel.

Conditioning can include any means to, for instance, remove solvent or dispersant of the precursor solution, and/or any means to produce matrix and/or dopant from the matrix and/or dopant material precursors, and/or any means to combine matrix and dopant materials to produce single or multi-component (e.g. doped) deposition particles, intermediate particles, deposition particle precursor particles, deposits and or precursor deposits (deposit precursors). Means for conditioning may include but are not limited to heating, cooling, evaporating, irradiating, compressing or pressurizing, mixing, vibrating, sonicating, decompressing or depressurizing, mixing, condensing, nucleating, decomposing (e.g. thermally or otherwise) and/or chemically reacting. For instance, conditioning is here understood to also mean causing a chemical or physical change (such as a chemical reaction) so that the intended effect of the material is activated or the material is released or chemically synthesized. Conditioning can be achieved by, for instance, changing pressure, concentration, evaporation (e.g. of solvent), chemical reaction or thermal decomposition. Chemical reaction may comprise adding a reagent to cause a chemical transformation of the particle or deposit. Chemical reaction or thermal decomposition can also be used to release or form the one or more deposition materials, be it matrix or dopant, from the one or more material precursors. Other means of conditioning and other conditioning means are possible.

A conditioner may include but is not limited to any or any combination of a heater (such as furnace or oven heated by, e.g. resistive heating, chemical or nuclear reaction and/or radiation), an irradiator (e.g. a device supplying electromagnetic radiation such as short wave, long wave, microwave, ultra violet, infra red and/or optical spectrum radiation), a cooler, a sonicator, a vibrator, an evaporator, a compressor, a decompressor or vacuum generator or pump, a thermal or chemical reactor, a mixer, a nozzle, or any other device or means for initiating, stopping or controlling the thermal, chemical, vibrational or pressure environment of the materials, particles, deposits and/or their precursors.

Deposit material and/or deposit precursor material can be produced by conditioning liquid precursors in the condensed phase. Matrix and/or dopant material can be produced from source material precursor either in the condensed phase or in the gaseous phase. In the case the source material is produced in the gas phase, it may deposit on a second source material or source material precursor containing precursor particles or deposition particles by gas phase condensation or collision processes, either of gas phase material or material precursor or of nucleated particles of the material or material precursor (dopant and/or matrix material particles or dopant and/or matrix material precursor particles). In the case the source material is produced in the condensed phase, the source material and/or source precursor material may already be dispersed in a second source material and/or matrix material precursor. In the case of a condensed phase material precursor, the material (dopant or matrix) produced from the precursor material may be also in the condensed phase.

The material and/or material precursor can be produced by condensing gaseous source material and or material precursor on a second condensed material and/or precursor material and/or particle.

Particles can be produced in the gas or liquid phase by chemical or physical nucleation. In the chemical nucleation process, a chemical (one or more matrix and/or dopant precursor materials containing a matrix and/or dopant material) is broken down (e.g. by reaction with another chemical, by thermal decomposition or by other conditioning means) to release and/or form material from material precursor.

This material may be a stable monomer and so may immediately grow by collision, coagulation and/or flocculation with other material molecules in the gas or condensed phase. In this case individual molecules are already stable clusters.

The material (dopant or matrix) may have, for instance, limited solubility in the second material (dopant or matrix), may have different melting temperatures or may otherwise tend to self-segregate and so may separate and form clusters or other separate material regions or structures within the second material. Often it is the dopant material or precursor that may form separate dopant material regions within the matrix material and/or matrix material precursor.

The dopant material may be immiscible in the matrix material and so may separate and form clusters or other separated regions or structures. The size of the resultant clusters may grow, for instance, by condensation, collision, flocculation and/or coagulation or any other means. Such means may include any physical process which minimized local energy states.

The dopant material may have limited solubility in the matrix material and so may separate and form clusters when elevated or supersaturated conditions are created.

The dopant material may become immicible in the matrix material upon elevated or supersaturated conditions and so may separate and form clusters. The size of the resultant clusters may grow, for instance, by condensation, collision and/or coagulation. The size may be limited by, e.g., quenching.

The size of the dopant material clusters in the final deposition particles can be controlled by a number of parameters. In the case of gas phase deposition of dopant particles, the size of the particles can be controlled by, for instance, controlling the supersaturation of the dopant precursor vapor, the rate of change in the supersaturation of the dopant precursor vapor and/or the residence time of the precursor particles in the gas phase before depositing in or on the matrix material or matrix precursor particles, among other parameters.

Particles can be produced in the gas or liquid phase by physical nucleation. In the physical nucleation process, a dispersion is created (by any means) in unsaturated conditions (i.e. at conditions where the saturation ratio is below, equal to or not much greater than 1) at and then conditions are changed, (e.g. by cooling, increasing concentration by, e.g. reaction or decomposition of precursor, decreasing pressure, or adiabatic expansion (for instance in a nozzle or expansion chamber)) to create sufficient supersaturation to nucleate particles. It is important to note that, in a physical nucleation process, it does not matter what the source of the material is. It can be, e.g. from the vaporization of a bulk of the source material and/or precursor material or it can come from a chemical source, e.g. a material precursor containing the source material) which is broken down (e.g. by reaction with another chemical or by thermal decomposition) to release the material. Thus, in the case of physical nucleation, this material is released in conditions in which the monomer is not a stable particle, meaning it will not immediately grow by collision with other dopant material and/or dopant precursor material molecules until conditions are changed to create sufficient supersaturation to nucleate particles. In this case, there is a clear molecular dispersed phase since individual molecules are not stable clusters. These may deposit on and may become dispersed in the matrix material and/or matrix precursor material to form deposition particles and/or deposition precursor particles.

In the physical nucleation process, a source material (one or more matrix and/or dopant material precursor containing a matrix and/or dopant material) is introduced into a gaseous or condensed phase medium initially at temperature and pressure conditions at which monomers are not stable (unsaturated or low saturation) and temperature and/or pressure are altered to create elevated or supersaturation conditions so that monomers become stable and clusters are formed.

Matrix and/or dopant particles and/or substructures can be produced in the liquid phase by precipitation. In one embodiment of the precipitation process, a solution containing deposit material is created (by any means) in unsaturated conditions (i.e. at conditions where the saturation ratio is below, equal to or not much greater than 1) at and then conditions are changed, (e.g. by cooling, decomposition of precursor, decreasing pressure) to create sufficient supersaturation to precipitate particles and/or substructures. In one embodiment of the precipitation process, a solution of deposit precursor material is created (by any means) in unsaturated conditions (i.e. at conditions where the saturation ratio is below, equal to or not much greater than 1) at and then the material is conditioned to release deposit material in saturated or supersaturated conditions to precipitate particles and/or substructures. It is important to note that, in a precipitation process, it does not matter what the source of the material is. It can be, e.g. from the dissolving of a bulk of the dopant material and/or dopant precursor material or it can come from a chemical source, e.g. a dopant precursor containing the dopant material) which is broken down (e.g. by reaction with another chemical or by thermal decomposition) to release the matrix and/or dopant material. In the case of precipitation, this source material and/or precursor material may be released in conditions in which the monomer is not a stable particle, meaning it will not immediately grow by collision with other dopant material and/or dopant precursor material molecules until conditions are changed to create sufficient supersaturation to nucleate particles (in which case, there is a clear molecular dispersed phase since individual molecules are stable clusters) or it may be released and be immediately in supersaturation conditions so at to immediately precipitate or may never reach supersaturation conditions and so will remain dispersed as monomers as a solution. Dopant substructures may become dispersed in the matrix material and/or matrix precursor to form deposition particles, intermediate particles and/or deposition precursor particles.

In the case of condensed phase, dopants and/or dopant precursors which may already be dispersed in the matrix and/or matrix precursor material, among other parameters, the temperature, the concentration in the matrix and/or matrix precursor material, the residence time in the matrix material and/or matrix material particles and/or precursor particles before quenching, either before aerosolizing, while aerosolized or while on the deposition substrate, among other parameters may be used to control the size of the dopant material substructure.

Quenching may serve the purpose of limiting the dimensions of any subparticle structure that may arise or grow withing the particle. Here quenching can be understood to be creating conditions wherein a liquid phase material is transitioned to a solid or glassy phase material, e.g. by increasing or lowering its temperature, UV curing or polymerizing matrix and/or dopant material and/or its precursors. Quenching may include halting the transition of the materials, material precursors and/or substructures in the deposition and/or deposition precursor particles to its minimum energy state by preventing or slowing the movement (e.g. diffusion) of materials in the deposition particle and/or deposition particle precursor particle. Quenching includes lowering the diffusion rate or matrix and/or dopant material. This may be, for instance, by increasing the dopant material size and/or by increasing the matrix material viscosity. Other means of quenching are possible. Quenching may occur as a step in conditioning or by halting conditioning. Quenching may include, e.g., heating, cooling, irradiating, compressing, vibrating, decompressing, mixing, condensing, nucleating and/or chemically reacting (e.g. of the dopant and/or matrix materials and/or their precursors) to effectively slow or halt the evolution or change in a material, particle or deposit property. Other means for quenching are possible. By controlling the various formation and quenching conditions, atomic level nano-scale structures are controllable.

Condensed phase precursor particles (and/or doped deposition particles precursor particles) are produced by dispersing a precursor solution with an atomizer. Said atomizer disperses the precursor particles in a carrier gas. The deposition precursor particles may contain matrix and/or dopant material and/or matrix and/or dopant precursor and/or one or more solvents. The carrier gas may be inert (such as argon or nitrogen) or may be reactive with one or more deposition particle precursor particle components.

The produced aerosol can flow through a conditioner which may be, for instance a tubular (e.g. essentially axisymmetric), a slit (e.g. essentially 2-dimensional planar) or other shaped reactor. The reactor may be a continuous flow or a batch reactor.

The liquid and/or solvent portion of the precursor particles may be fully or partially removed, e.g. by evaporation or chemical reaction during the conditioning process, and e.g. solid, glassy or molten deposition particles and/or deposition particle precursor particles suspended in the carrier gas (an aerosol) may be formed. Additionally sintering of the already formed particles may occur to produce compact spherical or spheroid deposition particles.

The produced deposition particles may be matrix material and/or matrix material precursor particles which may or may not comprise additional components, such as dopants and/or dopant precursors.

The aerosolized precursor particles may comprise a matrix and/or dopant precursor material. The matrix and/or dopant precursor material may be in solution. In one embodiment, the the solution may comprise a solvent. The solvent may be an organic solvent. In one embodiment the solvent may be an alcohol.

The matrix material precursor may be a silica containing material. The precursor solution and precursor aerosolized deposition precursor particles may also contain other components and their precursors. For an additional component of the particles, an addition material and/or precursor, for instance, an ion salt, may be added to the precursor solution. The ion salt may form precipitates in solution either before aerosolization/atomization or during particle conditioning in the aerosol reactor. The deposition particle precursor solution may be an alkaline or a basic solution.

The matrix and/or dopant materials can be formed from matrix and/or dopant precursors before or after the solution is aerosolized. The matrix and/or dopant materials or their precursors can form or precipitate as solids in the source solution before aerosolization.

After conditioning, the deposition particles and/or deposition precursor particles may be single or multicomponent, depending on the materials in the precursor solution and the process gases. For instance, as will be described later, a three-component system may be produced by adding an additional precursor to the precursor solution. For instance a titanium precursor and an iron salt precursor may be used to produce a deposition particle, a deposition precursor particle or deposit containing titanium and iron or a substructure of titanium an iron. Precursors such as compounds or salts of, for instance, Ta, V, Nb Ge, Yr, Al, B, F, P, Er, Yb and/or Nd can be used to produce a deposition particle, and intermediate particle, a deposition precursor particle, a precursor deposit or a deposit containing Ti, Fe, Ta, V, Nb, Ge, Yr, Al, B, F, P, Er, Yb and/or Nd their ions, oxides, carbides, nitrides, chlorides, bromides, sulfates, carbonyls and/or silicates. Other matrix and dopant materials and their sources are possible.

The solvent may act as a deposition material source.

A solution is here understood to mean any combination of one or more ingredients wherein at least one ingredient is in liquid, gel, slurry, or paste form. A solvent may include any and all liquid materials that dissolve, emulsify or otherwise disperse a material in the condensed (liquid, gel, glassy or solid) phase. Thus, included in solvents are, for instance, emulsifiers. A solvent may be selected from, for instance, the group of 1,1,2-Trichlorotrifluoroethane, 1-Butanol, 1-Octanol, 1-Chlorobutane, 1,4-Dioxane, 1,2-Dichloroethane, 1,4-Dioxane, 1-Methyl-2-pyrrolidinone, 1,2-Dichlorobenzene, 2-Butanol, 2,2,2-Trifluoroethanol, 2-Ethoxyethyl ether, 2-Methoxyethanol, 2-Methoxyethyl acetate, Acetic acid, Acetic anhydride, Acetonitrile (MeCN), Acetone, Benzene, Butyl acetate, Benzonitrile, Carbon tetrachloride, Carbon disulfide, Chloroform, Chlorobenzene, Citrus terpenes, Cyclopentane, Cyclohexane, Dichloromethane, Diethyl ether, Dichloromethane (DCM), Diethyl ketone, Dimethoxyethane, Dimethylformamide (DMF), Dimethyl sulfoxide, Deuterium oxideAcetone, Diethyl amine, Diethylene glycol, Diethylene glycol dimethyl ether, Dimethyl sulfoxide (DMSO), Dimethylformamide (DMF), Ethanol, Ethyl acetate, Ethylene glycol, Formic acid, Glycerin, Hexane, Heptane, Hexamethylphosphorus triamide, Hexamethylphosphoramide, Isopropanol (IPA), Isobutyl alcohol, Isoamyl alcohol, m-Xylene, Methanol, Methyl isobutyl ketone, Methyl ethyl ketone, Methylene chloride, Methyl Acetate, Nitromethane, n-Butanol, n-Propanol, N,N-Dimethylacetamide, o-Xylene, p-Xylene, Pentane, Petroleum ether, Petrol ether, Propylene carbonate, Pyridine, Propanoic acid, Tetrahydrofuran (THF), Toluene, Turpentine, Triethyl amine, Tert-butyl methyl ether, Tert-butyl alcohol, Tetrachloroethylene, and water. Other solvents are possible according to the invention.

The precursor solution may comprise an alcoholic TEOS (tetraethylorthosilicate) solution.

A particle (deposition, precursor or intermediate) may be in liquid (droplet), solid, gel, glassy, molten or any other condensed phase form. For use as a deposition particle, precursor particle or intermediate particle for, e.g., optical fiber production, it is advantageous that the deposition particle and/or intermediate particle be in liquid, gel, glassy or molten form so as to facilitate deformation upon deposition and to reduce the void space in the deposit and thus create a denser deposit layer.

A dopant or dopant precursor material is here understood to mean any material which contains any or all of the compounds or elements of which the dopant consists. A dopant may be any material which changes a property of the deposition particle as compared to a deposition particle comprised of essential only matrix material, for instance, the index of refraction of the deposition particle or the deposition particle deposit layer in the preform or optical fiber made from the deposition particles and/or precursor particles. Examples of dopants and dopant sources may include but are not limited to titanium, yttrium, germanium, erbium, aluminum, fluorine, boron, phosphorous, neodymium, tantalum, vanadium, niobium, ytterbium, their oxides, silicates and/or any combination thereof or compounds containing them as well as their ions. For instance germania (GeO2, germanosilicate fibers), phosphorus pentoxide (P2O5, phosphosilicate), and alumina (Al2O3, aluminosilicate) are possible dopants capable of raising the index of refraction of the deposition particles. Alternatively or in addition, the index of the cladding may be lowered e.g. by fluorine or boron oxide (B2O3) doping. Er3+ (erbium), Yb3+ (ytterbium) or Nd3+ (neodymium) for making active fibers. Other ingredients may be used used, e.g. for reducing quenching or photodarkening effects. Other dopants, dopant sources and their combinations are possible according to the invention.

As a dopant source, various dopant containing precursors can be used. Dopant sources include, but are not limited to, gaseous as well as liquid dopant sources.

A matrix material may be, for instance, a transparent polymer, silica, or silicate glass, fluoride glass, phosphate glass, chalcogenide glass and/or any combination thereof. Other matrix materials and their combinations are possible. The matrix material may include any compounds which include at least one of these materials. Such compounds may include carbides, nitrides, chlorides, bromides, sulfates, carbonyls and oxides.

A matrix precursor is here understood to broadly cover all materials in gaseous, liquid, solid or any other form that can be used to form matrix material. Said matrix precursor may comprise, e.g., silicon, fluorine and/or phosphorous. Examples of matrix precursors comprising silicon include, but are not limited to polymethylsiloxanes, such as hexamethyldisiloxane, octamethylcyclotetrasiloxane (OMCCTS), tetraethyl orthosilicate (TEOS), tetramethylcyclotetrasiloxane or silicon tetrachloride. Other matrix materials, their precursors and their combinations are possible according to the invention.

The produced deposition particles or deposition precursor particles can be in any of a number of intermediate states. For instance, this can refer to a state in which the particles are essentially without solvent but not yet fully conditioned to become deposition particles. Alternatively, it can include a state where either the matrix or the dopant material is essentially in its deposit material state, while its complement is still in a precursor state. Other intermediate states are possible in intermediate particles.

According to an embodiment, if deposition precursor particles or deposit are produced in an intermediate state, the method may further comprise further conditioning the deposition particles precursors or deposit precursors to produce deposition particles, precursor deposits or deposits from intermediate particles.

A deposition material precursor can refer to both the material comprising the deposition material and deposition precursor materials or deposition material or deposition precursor sources, and is here understood to broadly cover all materials in gaseous, liquid, solid or any other form, which, when conditioned, produce either deposition material in gaseous, liquid or solid form and/or deposition particles or deposits. This includes matrix source materials and dopant source materials. In addition, deposition material and deposition material precursor may also comprise e.g. surfactants to, e.g., allow dispersion by e.g. solvation, emulsification, through the use of surfactants or other dispersion techniques, in the solvent are hereby considered materials including deposition material unless otherwise stated.

By "material is dissolved" is meant that the material or ions thereof disperse and become fully or partially surrounded by solvent. By "emulsified" is here meant that a mixture of two or more liquids that are normally immiscible (nonmixable or unblendable) is created.

Aerosolizing the formed solution to produce precursor particles and conditioning the precursor particles and/or precursor deposit to produce deposition particles and/or a deposit provides the technical effect of control over various properties of the produced deposition particles and/or deposit such as their size, shape, morphology and composition. For instance, if a larger (or smaller) deposition particle is required, aerosolization parameters may be chosen so that larger (or smaller) precursor particles are produced which directly affects the size of the resulting deposition particle, which then affects the deposition properties and morphology of a deposit produced. Conversely, if a smaller (or larger) deposition particle is required, solvent parameters may be chosen such that a less (or more) deposition material exists per deposition particle precursor particle, which directly affects the size of the resulting deposition particle, which then affects the deposition properties and morphology of a deposit produced. Moreover, other parameters, such as temperature or viscosity can be altered to vary the size and size distribution of precursor particles and/or the deposition properties and morphology of a deposit produced.

The particle composition may refer to a predetermined ratio of components such as source materials, solvents and/or promoters. The predetermined ratio can be similar or equivalent to an intended intermediate or final composition of a deposition layer. For example, in prior art methods, aggregates which are deposited on a surface are aggregates of different ratios of different components. As such, it can be difficult with aggregates having different distributions of components to be deposited to create a desired uniformity in the deposition layer. Having deposition particles, or their precursors or other intermediate incarnations, with a predetermined ratio of components to be deposited, the deposition process can be improved. The predefined ratio can be between, and inclusive of, 1 to 0. For example, the predefined ratio can comprise only one component.

A means of producing optical fibers and optical fiber preforms from the deposition particles described herein is described in Canadian patent 2694173, which is incorporated by reference in its entirety herein.

The precursor solution can have a viscosity between 0.0001 Pascal Seconds (Pa S) and 10 Pa S. The precursor solution can have a viscosity between 0.0001 Pa S and 1 Pa S. The precursor solution can have a viscosity between 0.001 Pa S and 0.1 Pa S. In some instances, the suitable viscosity is a function of the aerosolization method and the preferred deposition particle precursor particle size. As it is clear to a skilled person, the solution may have any viscosity that is beyond the above ranges or a combination of different starting and ending points from the lists herein. A viscosity within the 0.0001 Pa S-10 Pa S can be advantageously low for the solution to be aerosolizable.

The viscosity of the deposit source material may be varied to accommodate the aerosolizer to be used. The solution may have a viscosity between 0.0001 Pa S and 10 Pa S. The solution may have a viscosity between 0.0001 Pa S and 1 Pa S. The solution may have a viscosity between 0.001 Pa S and 0.1 Pa S. The viscosity can be adjusted to allow for efficient aerosolization of the solution. Other viscosities are possible.

The solution can comprise 10-99.9 weight-percent of solvent. The solution can comprise 90-99 weight-percent of solvent. Other weight percentages of solvent are possible. Other ranges of solvent or a combination of different starting and ending points from the lists herein are possible according to the invention.

The precursor solution may comprise 0.01-90 weight-percent of deposition material and/or deposition material precursor (deposit source). The solution may comprise 0.1 to 50 weight-percent of the deposit source. The solution may comprise 1 to 10 weight-percent of the deposit source. Other weight percentages of deposit source are possible. The above range of ratios can provide for efficient deposition particle and/or deposition precursor particle production at different conditions. Other ranges of deposit sources or a combination of different starting and ending points from the lists herein are possible according to the invention.

The method may further comprise adding a promoter in order to produce deposition particles. A promoter can include, but is not limited to, an emulsifier, a co-solvent and/or a surfactant. Preferably, said promoter is decomposed, evaporated or otherwise removed from the deposition particle and or deposit upon conditioning.

An aerosol of the precursor solution can be produced by atomizing or otherwise dispersing in a gas the solution to form precursor particles. This can be achieved by any means known in the art.

The solution is aerosolized to produce precursor particles comprising some or all of the deposition materials and/or their precursors. The means for aerosolizing the solution to produce the precursor particles or intermediate particles can comprise, for instance, spray nozzle aerosolization, air assisted nebulization, spinning disk atomization, pressurized liquid atomization, electrospraying, vibrating orifice atomization, sonication, ink jet printing, magnetic mixing or stirring, spray coating, spinning disk coating, and/or electrospray ionization. An aerosolizer can comprise, for instance, a nebulizer, a droplet generator or an atomizer which may perform any of the above processes or any other process to produce precursor particles. As is clear to a skilled person, the solution may be aerosolized by other means known in the art.

The method of any of the above embodiments can be used in the synthesis of deposition particles, deposition precursor particles, intermediate particles, precursor deposits and/or deposits for the production of an optical fiber or preform. Said particles and/or deposits may be nanostructured.

Nanostructured is herein considered to be any structure, formation, inclusion, crystal, sub-particle or precipitate having a minimum characteristic length of below 1000 nm. Nanostructured materials are here considered nanomaterials. For instance, in the case of a deposition particle or deposit, the characteristic dimension is the diameter of the largest sub-particle structure be it, e.g., a crystal, an inclusion, a particle, precipitate or any region of high concentration of a particular material or structure, for instance, a dopant material or dopant material structure or segregated region.

According to an embodiment, the method further comprises depositing the deposition particle onto a substrate, for instance and preform substrate rod, tube or mandrel. The substrate may be, for example, a quartz, PC, PET, PE, silicon, silicone or glass substrate. Other substrates and/or substrate materials, including but not limited to other polymers and glasses, are possible. In the case of applications other than optical fiber or in the case of a removable mandrel, which is not intended to be included in the final preform or drawn fiber, the substrate material choice can be further broadened to include, e.g, non-optically clear materials such metals and ceramics.

An apparatus for producing deposition particles and/or deposition precursor particles is disclosed herein. The apparatus can comprise: means for aerosolizing a solution comprising a solvent and at least one deposition material and/or one or more of its precursors wherein the deposition material includes at least one matrix material and/or its precursors and may also include one or more dopant materials and/or their precursors, wherein the one or more deposition materials are dissolved, emulsified or otherwise dispersed in the solvent, to produce precursor particles comprising the deposition materials and/or their precursors; and means for conditioning the deposition precursor particles to produce deposition particles and/or intermediate precursor particles.

An apparatus for producing deposition particles and/or deposition precursor particles is disclosed. The apparatus may comprise: an aerosolizer for aerosolizing a solvent and at least one deposition material and/or one or more of its precursors wherein the deposition material includes at least one matrix material and/or its precursors and may also include one or more dopant materials and/or their precursors, wherein the one or more deposition materials are dissolved, emulsified or otherwise dispersed in the solvent, to produce precursor particles comprising the deposition materials and/or their precursors; and a reactor for conditioning the deposition precursor particles and/or intermediate deposition precursor to produce deposition particles and/or intermediate precursor particles.

The apparatus can include a means for introducing dopant material or its precursor in gaseous form. In one embodiment, the apparatus includes means for nucleating particles from the gaseous dopant material and/or dopant precursor material. In one embodiment, the apparatus includes means for mixing said nucleated particles and matrix material and/or matrix material precursor particles. Nucleation may include chemical or physical nucleation. Said means may include a mixing chamber having multiple inlets and means for mixing the multiple streams, e.g. with jets or baffles.

In an embodiment, the apparatus may further comprise means for forming a solution comprising a solvent and a material including matrix and/or dopant material material, wherein all or part of the deposition materials or their precursors are dissolved, emulsified or otherwise dispersed in the solvent. Such means may include a mixing chamber or vessel which may include, for instance a stirrer. The apparatus may further comprise means for conditioning the solution.

In one embodiment, the apparatus may further comprise means for adding a promoter in order to produce matrix and/or dopant material precursor particles comprised at least partly of the promoter.

A deposition particle precursor particle for the production of a deposition particle is disclosed herein. The deposition particle precursor particle may comprise a solvent, a material containing a deposition material and/or a deposition material precursor which includes one or more matrix materials and/or matrix precursor materials and may also include one or more dopant material and/or one or more dopant precursor materials. A deposition particle precursor particle for the production of a deposition particle or intermediate particle may also comprise a promoter.

The apparatus may further include a mixer or stirrer for forming a solution comprising a solvent and a material including deposition material and/or deposition material precursor material, wherein the material including deposition material is dissolved or dispersed in the solvent. The mixer may further include a conditioner.

The solution may contain a reagent which can chemically or catalytically react with one or more components of the solution to release deposition material from the deposition material and/or deposition material precursor material. Such reaction is considered a means of conditioning.

A deposition particle and a deposit is disclosed herein. The deposition particle or deposit can comprises one or more deposition materials including at least one matrix material and may include an additional dopant material. The dopant may be selected from a group consisting of Ge, Y, Al, B, F, P, Er, Yb, Nd and compounds containing them as well as their ions. For instance germania ($GeO_2$, germanosilicate fibers), phosphorus pentoxide ($P_2O_5$, phosphosilicate), and alumina ($Al_2O_3$, aluminosilicate) are possible dopants capable of raising the index of refraction of the deposition particles. Alternatively or in addition, the index of refraction may be lowered e.g. by fluorine or boron oxide ($B_2O_3$) doping. $Er^{3+}$ (erbium), $Yb^{3+}$ (ytterbium) or $Nd^{3+}$ (neodymium). Other dopant materials or their precursors can also be used. Such deposition particles and deposits are useful for making active optical fibers.

The deposition particle may be a deposition particle that can be used in deposition or an intermediate deposition particle. An intermediate deposition particle may have, for instance, substantially no remaining solvent but may have a substantial amount of deposition precursor material. Conversely, such an intermediate particle may have substantially no deposition precursor material, but may have a substantial amount of solvent. An intermediate deposition particle can be further conditioned to form a deposition particle. An intermediate particle can be deposited to produce a precursor deposit and the precursor deposit or precursor deposition layer can be further conditioned to form a deposit or deposition layer. A deposit or deposition layer may have substantially no solvent or deposition precursor material.

It can be beneficial under certain circumstances that any dopant remain inside the deposition particle and/or deposition layer. The technical effect of providing both the matrix material and the dopant in the same deposition particle may include, among other benefits, improved yield, higher deposition rate and material throughput and better control over deposit properties such as, e.g., higher homogeneity, uniformity and/or density and, e.g., less material segregation and reduced void space in the deposited deposition layer.

The deposition particle (including precursor particle or intermediate particle) may be a solid, a liquid or in glassy molten form. Additionally, or alternatively, all or part of the deposition particle may be crystalline. Similarly, all or part of the deposition particle may be amorphous. All or part of the matrix material of the deposition particle may be amorphous while all or part of the dopant material may be crystalline. All or part of the dopant material of the deposition particle may be amorphous while all or part of the bulk material may be crystalline.

The precursor particle mean or median size may vary so as to produce deposition particles, intermediate particles or precursor particles with desired properties (e.g. size, viscosity, composition, melting point, density). The mean or median deposition particle precursor particle size may be between 1 and 2000 micron. The deposition particle precursor particle size may be between between 2 and 1000 micron. The deposition particle precursor particle size may be between 5 and 500 microns. The deposition particle precursor particle size may be between 10 and 200 microns. The deposition particle precursor particle size may be between 20 and 100 microns. Other deposition particle precursor particle sizes are possible. The bounds of the precursor particle size may vary between any combination of above described bounds. Precursor particles within the described bounds are termed "size optimized precursor particles".

The deposition particle or intermediate particle mean or the median size may vary according to the precursor particle properties (e.g. the composition) so as to produce deposition particles or intermediate particles particles with desired properties (e.g. size, viscosity, composition, melting point). Ideally, the particle size, state (such as solidity or viscosity) and density are optimized to maximize deposition efficiency on the deposition substrate, minimize deposition or fowling of the reactor or deposition system, maximize deposit density and uniformity. These may vary depending, for instance, on the deposition velocity and substrate properties (e.g. temperature, morphology, surface characteristics). Ideally, the particle size is the smallest possible that, with the given deposition equipment, achieves the highest reasonable deposition efficiency. The deposition or intermediate particle precursor particle size may be between 0.5 and 500 microns. The deposition or intermediate particle size may be between between 1 and 300 microns. The deposition particle precursor particle size may be between 2 and 200 microns. The deposition or intermediate particle precursor particle size may be between 5 and 100 microns. The deposition or intermediate particle size may be between 10 and 50 microns. The bounds of the deposition particle or intermediate particle size may vary between any combination of above described bounds. Deposition or intermediate particles withing the described bounds are termed "size optimized deposition particles" or "size optimized intermediate particles".

Deposition particle precursor particles, deposition particle and/or intermediate particles may be of different size distribution depending on the conditions of the aerosolization and properties (such as viscosity) of the solution. The standard deviation of the precursor particle, deposition particle or intermediate particle size distribution may be below 4. The standard deviation of any of said particle size distributions may be below 3. The standard deviation of any of said particle size distributions may be below 2.5. The standard deviation of any of said particle size distribution may be below 2. The standard deviation of any of said particle size distribution may be below 1.75. The standard deviation of any of said particle size distribution may be below 1.5. The standard deviation of said particle size distribution may be below 1.3. The standard deviation of said particle size distribution may be below 1.2. The standard deviation of said particle size distribution may be essentially monodisperse.

In the absence of particle fracturing, agglomeration or coagulation, each particle of solution may result in a deposition particle. Reactor conditions such as temperature, solution composition, deposit source material and carrier gas feed rates, solvent, matrix material, dopant weight fractions in solution, level of turbulence, reactor configuration or geometry, classification or pre-classification of deposition particles and/or deposition precursor particles, loading/concentration of deposition particles and/or deposition precursor particles and pressure can be varied to minimize collisions in the gas phase leading to agglomeration and coagulation and/or reactor or nozzle wall deposition. Various means can be used to achieve these goals, e.g. dilution flows of various compositions, pressures, temperatures, flow rates and levels of turbulence. Other means of controlling collisions and/or reactor wall deposition are possible.

In certain instances, the deposition material may not be fully released from the source material and intermediate deposition particles can be formed. In this case, for instance, the solvent may be removed but the deposition material may not be released and/or synthesized from some or all of the source material comprising deposition material. The intermediate particles can be further conditioned to release and/or synthesize the deposition material from the deposition material precursor material. This way, deposition particles can also be formed.

In one embodiment, the dopant material is not released from the dopant precursor and an intermediate dopant particle or subparticle is formed.

Production rates, quality control and yield of deposition material are a function of the efficiency of material conversion and uniformity, supermolecular sub-particle structure (if any) and composition of deposition particles. Since certain properties of deposition material are dependent on the properties of their deposition particles during synthesis, the deposition material produced by this method can have controllable properties. For example, in the case of optical fiber deposition particles, such as silica based particles, dopant concentration and subparticle structure (e.g. incorporation and dispersion of dopant throughout the deposition particle and crystalline or amorphous regions or subparticles or uniform dispersions) of the deposition material, is directly related to the deposition particle properties and deposition layer properties in the optical fiber or optical fiber preform.

Therefore, the size and other properties of the deposition particles produced by the above method can be controlled by selecting different solution preparation, aerosolization and/or conditioning techniques and parameters.

The following are a set of non-limiting examples:

EXAMPLES

Aerosol Reactor Set-Up:

Unless otherwise stated, all deposition particles in the examples following are prepared under the same conditions and only the concentrations of components in the precursor solutions are altered in order to produce deposition particles having different compositions.

An aerosol of precursor particles was produced by atomizing precursor solution using a constant output atomizer with 3 kPa upstream pressure of nitrogen. A 3.15 lpm (20C) aerosol flow was achieved. After producing an aerosol of deposition particle precursor particles, an additional dilution flow of 7.1 lpm of pressurized air was supplied to reduce agglomeration. A fraction of the produced diluted aerosol was then transported to a tubular furnace reactor (inner diameter 22 mm, heated length 40 cm). The aerosol reactor carrier gas flow rate was 0.3 lpm. In the reactor the precursor particles underwent thermal treatment (a form of conditioning) between 800-1200 C whereupon solid silica based particles were formed (silica matrix material). The size of the deposition particles was found to be dependent on the precursor solution composition and reactor parameters (dilution rate, flow rate and temperature/cooling rate). The size distribution of the produced deposition particles was measured downstream of the synthesis reactor with a differential mobility analyser, combined with a condensation nucleus counter and ranged from approximately 1 to approximately 1000 μm.

Other matrix and dopant material sources, solvents, promoters, carrier gases, reactor materials, reactor temperatures, colling rates and configurations, and flow rates (aerosol and dilution) are possible. Other means of conditioning are possible. Conditioning may take place all or in part before the solution is aerosolized, while the solution is in aerosolized form or after the fully or partially conditioned particles are deposited.

Example 1: Pure Silica Particles $SiO_2$ particles were produced using a alcoholic TEOS solution with added water and ammonia as a precursor. Reactants as for sol-gel synthesis were used, but with parameters that avoided fast particle formation.

In a 150 ml Erlenmeyer flask, ethanol, distilled $H_2O$ and $NH_3$ were mixed with a magnetic stirrer at 24° C. (pH=11). While stirring, TEOS (a matrix source) was added, drop by drop, to the solution. After 20 hrs of reaction time, spherical particles with a narrow particle size distribution and a mean size of a few nm in diameter were produced in the solution, thus, part of the conditioning was achieved in the mixing vessel before aerosolization. Here chemical reaction is a form of conditioning. A mixture of already formed aquasol particles and initial precursor solution formed the aerosol droplets. Thus, the droplets consisted of an aquasol of solvent and matrix particles. The droplets here may be considered intermediate particles as part of the conditioning was performed before aerosolization or as precursor particles should one consider the particles in solution as the matrix precursor.

| Precursor 200 ml | Reactor Parameters |
| --- | --- |
| 17 ml H2O | Reactor temperature: 1000 C. |
| 170.7 ml EtOH | N2 carrier gas: 3.15 lpm |
| 0.3 to 0.6 ml NH3 | Dilution air: 0.7 to 7.11 pm |
| 12 to 24 ml TEOS | Liquid feed: 3 turns |

After conditioning the aerosol particles in the furnace reactor, pure spherical silica deposition particles with a size distribution having a maximum at approximately 60 nm were produced. No supermolecular substructure was observed in the produced deposition particles. Other sizes can be produced by applying different flow rates of carrier gas, the liquid feed and reactor temperatures. It is thusly demonstrated that $SiO_2$ particles can be successfully produced and collected according to the method and apparatus of the invention. Said particles can be controlled in size according to, e.g., the applied carrier gas flow rates, the aerosolization technique and conditions, the liquid feed rate and the temperature and cooling rate of the synthesis reactor.

By decreasing the dilution air to 0.7 lpm, agglomeration caused the produced particles to grow which resulted in a mean particle size of approximately 0.1 micron. By further increasing the TEOS and NH3 concentrations to 24 and 0.6 ml respectively, a mean particle size of 0.5 micron was achieved. By further aerosolizing by an ultrasonic nebulizer (RBI Pyrosol 7901), a mean particle size of 6 micron was achieved.

By using other dilution rates, TEOS and NH3 concentrations, aerosolization techniques and machinery, deposition particles even up to approximately 1000 micron are possible to produce.

Example 2: Silica-Iron-Titanium $TiO_2$ particles were produced by the use of titanium-tetraisopropoxid (TTIP) as the precursor in an alcoholic solution, which also forms insoluble precipitates in water by a hydrolysis reaction. Because of this, it is not possible to use water as a reactant, as described in Example 1. For an additional component of the particles, an ion salt in defined amounts was added to the precursor solution. It was observed that iron as $Fe(NO_3)_3 \times 9H_2O$ forms precipitates in the alkaline solution. A mixture, where TEOS, TTIP and iron nitrate were dispersed in pure ethanol wherein the elemental ratios in wt % were 3 for Si/Ti and to 6 for Si/Fe. Other matrix and dopant precursors are possible according to the invention. Other predetermined ratios of components are possible according to the invention.

Particles were generated at three different reactor temperatures (1200/1000/800 C). Each of these also correspond to a different colling rate when the aerosol exits the reactor with higher reactor temperatures corresponding to faster cooling rates. It was found that there was an increase in the mean particle diameter with decreasing reactor temperature. Not to be bound by theory, it was understood that the increase in particle size in relation to the reactor temperature could be explained by the decrease in the evaporation of the liquid parts at lower temperatures, resulting in reduced fracturing of the particles into smaller daughter particles. Furthermore, the higher sintering temperature was understood to result in more densely packed particles and thus a smaller mean particle diameter. Moreover, the higher temperatures corresponded to higher cooling rates and more rapid quenching of the system.

Particles produced at 1200° C. had an internally inhomogeneous structure having a crystalline phase. Particles produced at 800° C. had a more homogeneous structure with a substructure in the range of a few nanometers. Not to be bound by theory, it is understood that the driving force for the segregation can be found in the reduction in free energy of the system by the formation of the thermodynamically favored phase. The growth of the individual sub-particle domains can be explained by the reduction of the interfacial energy. Not to be bound by theory, it is understood that there are no thermodynamically stable mixed oxide phases, which implies that separated phases have to be formed. The method and apparatus, however, allow the size of the phase separated regions (islands) of dopant material in the matrix material to be controlled.

TEM analysis of the particles revealed the existence of both iron and titanium containing clusters/regions in the produced particles. Titanium and iron crystallites were detected within the 800 C sample and were found to be in the nanometer size range. In the 1200 C sample, TiO2 and Fe2O3 were generated in two separate phases and no third phase, such as ilmenite (FeTiO3) were detected.

Electron diffraction showed that that rutile (TiO2) and hematite (Fe2O3) was generated. In the 1200 C sample, numerous crystallites having a variety of orientations existed while in the 800° C. sample either no crystallites or very small (1-3 nm) crystallites were formed.

Thus, rutile and hematite were formed in the aerosol reactor at the temperature of 1200 C and sub 10 nm sized crystallites were formed in the particles produced at 800° C. Not to be bound by theory, it is understood that the lower temperature reduces the effect of elemental mobility within the matrix. Thus, "Homogeneous" particles with no detectable substructures above molecular size can be produced according to the method with an optimum set of parameters, which includes the reactor temperature, cooling rate and the concentration of elements in the precursor solution.

Inhomogeneous particles changed to a "homogeneous" particles by reducing the reactor temperature to 800° C. The reason for this effect can be explained by the reduced mobility of the iron and titanium ions at lower temperatures, thus forming smaller "crystallites". By controlling the temperature and rate of cooling, a range of homogeneity/inhomogeneity and substructure size can be achieved. Consequently, it was found that the size of substructures below a given threshold (e.g. the wavelength of a given frequency of light) can be controlled.

By decreasing the dilution air to 0.7 lpm, agglomeration caused the produced particles to grow which resulted in a mean particle size of approximately 0.1 micron.

By further increasing the TEOS and NH3 concentrations to 24 and 0.6 ml respectively, a mean particle size of 0.5 micron was achieved.

Larger or smaller particles are possible by, for instance, increasing or decreasing the size of the precursor droplets, by increasing or decreasing the TEOS and/or NH3 concentrations and/or by decreasing or increasing the dilution air. By further aerosolizing by an ultrasonic nebulizer, a mean particle size of 6 micron was achieved.

By using other dilution rates, matrix and dopant source materials and concentrations, aerosolization techniques and machinery, deposition particles even up to approximately 1000 micron are possible to produce with the method. Other matrix and dopant material sources, composition ratios, solvents, promoters, carrier gases, reactor materials, reactor temperatures, colling rates and configurations, and flow rates (aerosol and dilution) are possible. Other substructure sizes are possible.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for producing an optical fiber preform or an optical fiber with at least one layer having a predefined ratio of matrix material to dopant material, said method comprising the steps of:
    forming substructure optimized deposition particles from deposition particles and/or deposition particle precursor particles and/or intermediate particles comprising a condensed phase mixture of a solvent, the matrix material and the dopant material, wherein said deposition particles are between 1 and 100 microns in size and are made up of a predetermined ratio of matrix material and dopant material;
    depositing said deposition particles and/or deposition particle precursor particles and/or intermediate particles on a deposition surface to achieve the desired layer, wherein some or all of the matrix material is produced by conditioning one or more matrix precursors comprising tetraethyl orthosilicate (TEOS) and/or silicon tetrachloride and/or one or more polymethylsiloxanes, transparent polymers, chalcogenides, fluorine and/or phosphorous or the deposition particles comprise a transparent polymer, silicate glass, fluoride glass, phosphate glass, chalcogenide glass and/or a combination thereof; and
    wherein the deposition particles are formed from precursors of matrix material and/or dopant material, which are maintained in a condensed phase throughout the method.

2. The method of claim 1, wherein the deposition particles are deposited in solid, liquid, glassy or molten phase.

3. The method of claim 1, wherein the deposition particles are formed by aerosolizing the condensed phase mixture to form the deposition particles.

4. The method of claim 1, wherein the deposition surface is a surface of a fiber, a preform or a mandrel.

5. The method of claim 1, wherein the predefined ratio of matrix material to dopant is 0 to 1.

6. The method of claim 1, further comprising conditioning the deposition particles and/or deposition particle precursor particles and/or intermediate particles either before or after deposition on the deposition surface.

7. The method of claim 1, further comprising:
    depositing an additional layer having a different predefined ratio of matrix material to dopant material from the first layer including forming new deposition particles from a condensed phase mixture of a solvent and matrix and dopant sources, wherein said new deposition particles are made up of a new predetermined ratio of the matrix material and dopant material, and depositing said new deposition particles on a surface layer comprising a previous deposition layer.

8. The method of claim 1, wherein one or more of the polymethylsiloxanes is hexamethyldisiloxane, octamethylcyclotetrasiloxane (OMCCTS), or tetramethylcyclotetrasiloxane.

* * * * *